(12) United States Patent
Haoyang et al.

(10) Patent No.: US 9,712,959 B2
(45) Date of Patent: Jul. 18, 2017

(54) NETWORK SYSTEM FOR POSITIONING SERVICES BASED ON WIRELESS COMMUNICATION TECHNOLOGIES

(71) Applicant: LEGAO LEJIA (BEIJING) INFORMATION TECHNOLOGY CO., LTD., Beijing (CN)

(72) Inventors: Yuan Haoyang, Beijing (CN); Wu Xian, Beijing (CN); Qi Ji, Beijing (CN)

(73) Assignee: LEGAO LEIJA (BEIJING) INFORMATION TECHNOLOGY CO., LTD. (CN)

( * ) Notice: Subject to any disclaimer, the term of this patent is extended or adjusted under 35 U.S.C. 154(b) by 0 days.

(21) Appl. No.: 15/357,851

(22) Filed: Nov. 21, 2016

(65) Prior Publication Data

US 2017/0156025 A1 Jun. 1, 2017

(30) Foreign Application Priority Data

Nov. 30, 2015 (CN) .......................... 2015 1 0856184

(51) Int. Cl.
*H04W 4/02* (2009.01)
*H04W 84/12* (2009.01)
*H04W 48/16* (2009.01)
*H04B 3/54* (2006.01)
*H04L 12/10* (2006.01)
(Continued)

(52) U.S. Cl.
CPC ............... *H04W 4/02* (2013.01); *G01S 5/021* (2013.01); *G01S 5/0252* (2013.01); *H04B 3/54* (2013.01); *H04B 17/318* (2015.01); *H04L 12/10* (2013.01); *H04L 41/0672* (2013.01); *H04L 41/12* (2013.01); *H04L 67/34* (2013.01); *H04W 52/322* (2013.01); *H04W 72/005* (2013.01)

(58) Field of Classification Search
CPC ... H04W 4/02; H04W 52/322; H04W 72/005; H04B 17/318; H04B 3/54; G01S 5/021; G01S 5/0252; H04L 12/10; H04L 41/0672; H04L 41/12; H04L 67/34
USPC .......................................... 455/456.1–456.5
See application file for complete search history.

(56) References Cited

U.S. PATENT DOCUMENTS

2008/0091345 A1* 4/2008 Patel ..................... G01S 5/0252
701/532
2008/0161011 A1* 7/2008 Babin ................... H04W 64/00
455/456.1
(Continued)

*Primary Examiner* — Nathan Taylor
(74) *Attorney, Agent, or Firm* — Hauptman Ham, LLP

(57) ABSTRACT

A network system for positioning services based on wireless communication system, including base stations, a dedicated access apparatus, cables, and a server. The base stations, the dedicated access apparatus and the cables constituting a private network. The server constituting a public network. The base stations are configured to send and receive signals in a broadcasting manner, and transmit the signals to the server through the cables and the dedicated access apparatus. The dedicated access apparatus is configured to transfer transmission data between the private network and the public network, forward data from the base stations to the server, and forward data from the server to a corresponding base station. The cables are configured to transmit data between the base stations and between the base stations and the dedicated access apparatus. The server is configured to perform data processing according to the received data collected by at least one base station.

16 Claims, 1 Drawing Sheet

(51) Int. Cl.
  *H04L 12/24* (2006.01)
  *H04W 52/32* (2009.01)
  *H04W 72/00* (2009.01)
  *H04L 29/08* (2006.01)
  *H04B 17/318* (2015.01)
  *G01S 5/02* (2010.01)

(56) References Cited

U.S. PATENT DOCUMENTS

| | | | | |
|---|---|---|---|---|
| 2012/0170558 | A1* | 7/2012 | Forbes | H04W 88/08 370/338 |
| 2015/0099536 | A1* | 4/2015 | Thompson | H04W 4/02 455/456.1 |
| 2015/0256980 | A1* | 9/2015 | Ogale | H04W 64/00 370/328 |
| 2015/0281907 | A1* | 10/2015 | Huber | G06Q 20/1235 455/456.1 |
| 2016/0149635 | A1* | 5/2016 | Hinman | H04B 7/15507 370/315 |

* cited by examiner

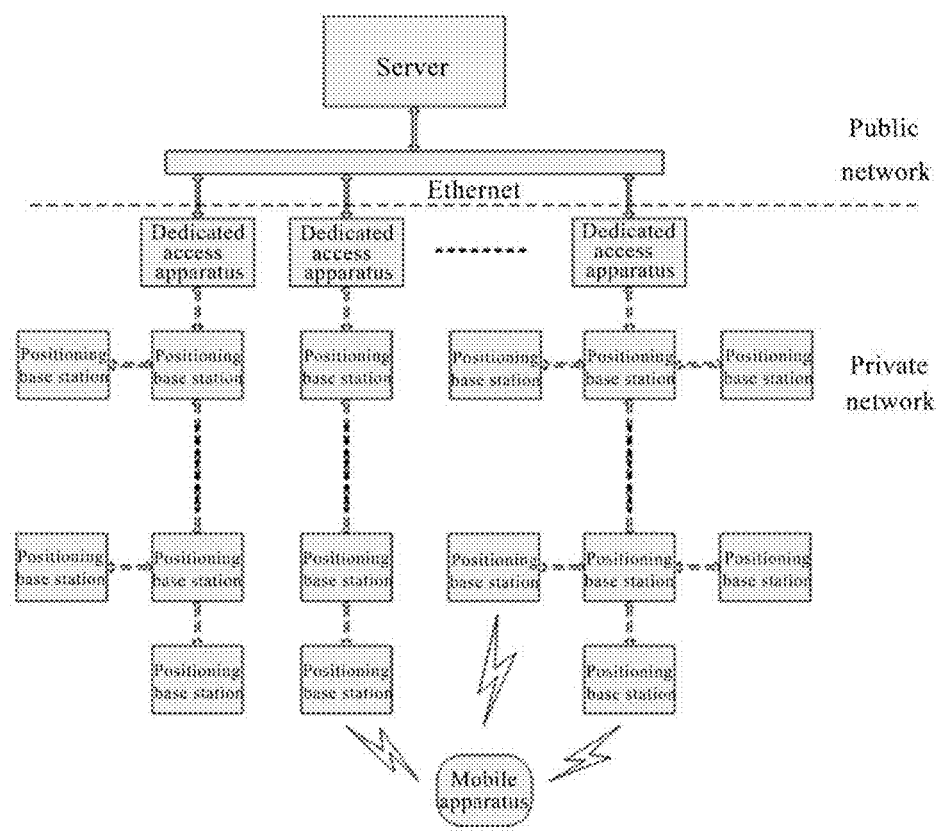

NETWORK SYSTEM FOR POSITIONING SERVICES BASED ON WIRELESS COMMUNICATION TECHNOLOGIES

FIELD OF THE DISCLOSURE

The present invention relates to network technologies. In particular to a network system for positioning services which are based on wireless communication technologies.

BACKGROUND OF THE DISCLOSURE

Currently, outdoor positioning is basically, recognized by a satellite-based positioning technology, such as GPS in America, GLONASS in Russia, BEIDOU in China and GALILEO in Europe. However, when a user is indoors, the positioning function of these systems can hardly be realized. However, with the continuous development of cities, large modern buildings (shopping malls, large hospitals and exhibition centers) develop faster and become larger in size. Consequently, the demands for indoor positioning and location-based services are growing. Therefore, indoor positioning becomes a goal to be solved urgently. One way is based on the wireless communication technologies including Wi-Fi, Bluetooth, ZigBee or more, wherein the Wi-Fi-based positioning can only achieve meter-level positioning and has very poor positioning accuracy; for the Bluetooth-based positioning, the signal intensity will be weakened with the drop in the battery voltage which means the positioning accuracy is instable, and due to the dot-like dispersed installation and arrangement mode, it is unable to form a uniform network so that it is difficult to conduct subsequent management; and for the ZigBee positioning, it is required to deploy a dedicated sensor network so that the implementation cost is high and it is disadvantageous for popularization. Therefore, how to effectively and reliably construct an indoor positioning network and an indoor positioning system to realize indoor positioning with high accuracy and high efficiency is a problem to be solved.

SUMMARY OF THE DISCLOSURE

The objection of the invention is to overcome above mentioned drawbacks and provide an internet system and device for fuzzily inputting password for activating/validating the internet system.

An objective of the present invention is to solve at least one of the above mentioned problems and provide a network system for positioning services so as to realize effective, reliable and accurate indoor positioning based on the network system.

To achieve the above objective, the present invention provides a network system for positioning services based on wireless communication technologies, comprising base stations, a dedicated access apparatus, cables, a server and Ethernet; the base stations, the dedicated access apparatus and the cables constituting a private network, the server and the Ethernet constituting a public network, wherein:
the base stations are configured to send and receive radio signals in a broadcasting manner, and transmit the received radio signals to the server through the cables and the dedicated access apparatus;
the dedicated access apparatus is configured to transfer transmission data between the private network and the public network, forward data from the base stations to the server, and forward data from the server to a corresponding base station;
the cables are configured to perform data transmission between the base stations and between the base stations and the dedicated access apparatus; and
the server is configured to perform corresponding data processing according to the received data collected by at least one base station.

Specifically, the base stations receive radio signals from other base stations, and transmit the radio signals to the server through the cables and the dedicated access apparatus so as to monitor the other base stations.

Further, the base stations are further configured to forward, to the dedicated access apparatus, data from other base stations that are connected through cables.

Further, the base stations are further configured to supply electricity to other base stations through the cables.

Further, the dedicated access apparatus is further configured to provide, through the cables, electricity to base stations that are connected to the dedicated access apparatus.

Further, the server is further configured to receive and save related data of each of the base stations so as to monitor all the base stations in real time.

Specifically, the related data of the base stations comprise an apparatus ID, map coordinates, a network address, and a wired connection topological relation between the base stations.

Specifically, when the server fails to receive data reported by a base station, the server sends a restart instruction to the base station and monitors data reported by the base station and/or surrounding base stations so as to confirm whether a fault occurs in the base station.

Specifically, the malfunction of the base station includes malfunction notification on the wired side, data forwarding malfunction on the wired side, and irregularity in positioning information broadcasting on the wireless side.

Specifically, the server calculates actual map coordinates of a base station based on broadcast positioning information of surrounding base stations received by the base station, and compares the actual map coordinates with the map coordinates of the base station stored in the server so as to confirm the installation location of the base station is correct/incorrect.

Preferably, the server is further configured to send configuration information and network parameters to all the base stations so that each of the base stations executes a configuration operation according to the received configuration information and network parameters.

Specifically, the configuration information includes broadcasting content, broadcasting period and broadcasting power.

Further, the server is further configured to send a firmware update instruction to a base station, and receives update confirmation information returned by the base station so as to activate firmware online upgrading.

Specifically, the system further includes a mobile terminal; and the server is further configured to perform corresponding data processing according to the received data, related to the mobile terminal, collected by at least one base station.

Specifically, the server is further configured to calculate location information of the mobile terminal according to the received mobile terminal ID and signal intensity value collected by at least one base station.

Specifically, the mobile terminal is a hardware apparatus that has an interaction function or can run a particular function relates to location.

Optionally, the mobile terminal is configured to receive broadcast data, including a base station ID and a signal intensity value, broadcasted by at least three base stations, and calculate location information of the base stations based on the broadcast data.

Preferably, the system is configured to position the mobile terminal.

Compared with the prior art, the solutions of the present invention have the following advantages:

1. The way of supplying electricity to the base stations in the network system of the present invention is different from the prior art. The construction of a network by integrating wired data transmission and electricity supply can enable electricity transmission between the dedicated access apparatus and the base stations while realizing the electric power transmission there between. Meanwhile, by using the cables of integration of electricity supply and data transmission, high cost resulted from construction or post maintenance can be avoided, and a private network system with low maintenance cost is realized.

2. The network topology of the network system of the present invention is an extensible tree network structure which is different from the conventional star or ring network topology in the prior art. Such a structure is convenient for subsequent flexible extension and reduces the cost of construction and post maintenance.

3. The network system of the present invention has the capability of monitoring between base stations, so that the server may find faulted base stations in time and then perform corresponding maintenance and management.

4. The network system of the present invention can enable a base station to monitor other surrounding base stations on a wireless channel and then transmit the monitored information to the server, so that real-time communication and mutual monitoring between the base stations can be realized, the detection of bases stations by operators on site as in the prior art is avoided, and self-monitoring is realized.

Additional aspects and advantages of the present invention will be partially appreciated and become apparent from the descriptions below, or will be well learned from the practice of the present invention.

BRIEF DESCRIPTION OF THE DRAWINGS

The above and/or additional aspects and advantages of the present invention will become apparent and readily appreciated from the following description of embodiments taken with reference to the accompanying drawings, in which:

FIG. 1 is a structural diagram of a specific implementation of the network system of the present invention for a scenario of positioning a mobile terminal.

DETAILED DESCRIPTION OF THE EMBODIMENTS

Embodiments of the present invention will be described in detail hereinafter. The examples of these embodiments have been illustrated in the drawings throughout which same or similar reference numerals refer to same or similar elements or elements having same or similar functions. The embodiments described with reference to the drawings are illustrative, merely used for explaining the present invention and should not be regarded as any limitations thereto.

It should be understood by a person skilled in this art that singular forms "a", "an", "the", and "said" can be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it may be directly connected or coupled to other elements or provided with intervening elements therebetween. In addition, "connected to" or "coupled to" as used herein can include wireless connection or coupling. As used herein, term "and/or" includes all units or any unit or all combination of one or more associated listed items.

It should be understood by a person skilled in this art that, unless otherwise defined, all terms (including technical and scientific terms) used herein have the same meaning as commonly understood by one person of ordinary skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person skilled in this art that term "terminal" and "terminal apparatus" as used herein comprise not only devices with a wireless signal receiver having no emission capability but also devices with receiving and emitting hardware capable of carrying out bidirectional communication over a bidirectional communication link. Such devices can include: cellular or other communication devices with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or global positioning system (GPS) receivers; and/or conventional laptop and/or palmtop computers or other devices having and/or including a RF receiver. The "terminal" and "terminal apparatus" as used herein can be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, and a music/video player terminal. For example, it can be a PDA, a Mobile Internet Device (MID) and/or a mobile phone with a music/video playback function, or can be an apparatus such as a smart TV and a set-top box.

It should be understood by a person skilled in this art that the far-end network apparatus as used herein includes, but is not limited to, a computer, a network host, a single network server, multiple network server clusters, or a cloud constituted by a multiple of servers. Here, the cloud is constituted by a large number of computers or network servers based on cloud computing, wherein the cloud computing, as one distributed computing, is a super virtual computer constituted by a group of loosely coupled computer clusters. In the embodiments of the present invention, a far-end network apparatus, a terminal apparatus and a WINS server can communicate with each other in any communication manner, including but not limited to, mobile communication based on 3GPP, LTE or WIMAX, computer network communication based on TCP/IP or UDP protocols, and near-range wireless transmission based on Bluetooth or infrared transmission standards.

The present invention provides a network system for positioning services based on wireless communication technologies, including base stations, a dedicated access apparatus, cables, a server and Ethernet, where the base stations, the dedicated access apparatus and the cables constitute a private network, and the server and the Ethernet constitute a public network. The topology of the network system is a tree structure. Wherein:

The base stations are configured to send and receive radio signals in a broadcasting manner, and transmit the received radio signals to the server through the cables and the dedicated access apparatus.

Wherein, the radio signals sent or received in a broadcasting manner include but are not limited to one or more of Bluetooth, Wi-Fi and NFC, and certainly, can also be radio signals in other forms. The form of the radio signals is not limited in the present invention. A base station sends, according to the functions configured by the server, radio signals outside to form a signal field in the space, which is available for other mobile apparatuses. Meanwhile, the base station receives radio signals emitted by other mobile apparatuses, and transmits the signals to the server through the cables and the dedicated access apparatus.

The base station receives radio signals sent by other base stations, so that the base stations can communicate with each other in real time so as to realize mutual monitoring between the base stations. Meanwhile, information about other base stations is transmitted to the server through the cables and the dedicated access apparatus, so that the server can timely find faulted base stations and then perform corresponding maintenance and management.

The base stations are further configured to forward (to the dedicated access apparatus) data from other base stations that are connected through cables. Meanwhile, the base stations also supply electricity to other base stations through the cables, so that the electricity supply of the base stations is ensured, and the signals of the base stations being weakened due to insufficient electricity can be avoided. Particularly when the system is being used for positioning, inaccurate positioning due to insufficient electricity can be avoided, and thus a positioning service with higher accuracy is provided to users.

The dedicated access apparatus is configured to transfer transmission data between the private network and the public network, forward data from the base stations to the server, and forward data from the server to a corresponding base station.

The dedicated access apparatus forwards data from the base stations to the server through the public network, and meanwhile forward data from the server to a corresponding base station through the public network, wherein the server is a part of the public network and the base stations are a part of the private network so that the transmission data between the private network and the public network is transferred. In addition, the dedicated access apparatus can further supply electricity to base stations that are connected to the dedicated access apparatus. This electricity supply mode can avoid high cost resulted from construction or post-maintenance and thus actualize a private network system with low maintenance cost.

The cables are configured to transmit data between the base stations and between the base stations and the dedicated access apparatus.

The cables are connected between the base stations, and transmit data between the base stations, thereby realizing real-time communication and mutual monitoring between the base stations. Meanwhile, when the dedicated access apparatus in the constructed network topology is far away from a base station and cannot supply electricity to the base station, electricity is delivered to the base station through the cables by other base stations. Thus, the cost of construction and post maintenance can be reduced.

The cables are further configured to transmit data between the base stations and the dedicated access apparatus so as to transmit information collected by the base stations to the server through the dedicated access apparatus, and the dedicated access apparatus supplies electricity to the base stations through the cables.

The server is configured to perform corresponding data processing according to the received data collected by at least one base station.

In the specific embodiment of the present invention, the system further includes a mobile terminal, which is configured to position the mobile terminal. The server calculates location information of the mobile terminal according to the received mobile terminal ID and signal intensity value collected by a base station, wherein there is at least one base station. Specifically, the at least one base station receives a radio signal including a mobile terminal ID and a signal intensity value and a radio signal including a positioning request both emitted by the mobile terminal, and uploads the corresponding radio signals to the server through the cables and the dedicated access apparatus. Upon receiving the positioning request, the server positions the mobile terminal according to the received mobile terminal ID and signal intensity value forwarded by the at least one base station, and transmits location information to the mobile terminal. Wherein, the mobile terminal is a hardware apparatus that has an interaction function or can run a particular function relates to location.

In other embodiments, the server is a part of the public network of the present invention, and is further configured to receive and save related data from the base stations in the private network, monitor the operating state of all the base stations in the private network space in real time, acquire the system operating state of the base stations in real time, and display fault information.

Specifically, after the network system of the present invention has been constructed, the server saves related data of the base stations, including apparatus IDs, map coordinates of the base stations, network addresses of the base stations, and a wired connection topological relation between the base stations.

The server analyzes, based on data reported by a base station, whether a fault occurs in the base station, and provides corresponding maintenance and warning functions. In a specific embodiment, the fault of the base station includes malfunction notification on the wired side, data forwarding malfunction on the wired side, irregularity in positioning information broadcasting on the wireless side and incorrect base station installation location.

When the server fails to receive data reported by a base station, the server sends a restart instruction to the base station and monitors data reported by the base station and/or surrounding base stations so as to confirm whether a fault occurs in the base station. The specific embodiment will be described below.

1. When the server side fails to receive data reported by a base station but can receive data that is reported by base stations cascaded-downwards to the base station, the server sends a restart instruction to the base station and monitors data reported by the base station. If the server sends the restart instruction for more than preset times within a set time and still fails to receive data reported by the base station, the base station is considered to be deactivated, and there is a malfunction notification fault on the wired side.

Then, the server gives a warning and sends prompt information to confirm that a fault occurs in the base station in time.

2. When the server side fails to receive data reported by a base station and also fails to receive data that is reported by base stations cascaded-downwards to the base station, the server sends a restart instruction to the base station and monitors data reported by the base station and data that is reported by base stations cascaded to the base station. If the server sends the restart instruction for more than default within a set time and still fails to receive related reported data, the base station is considered to be deactivated, and there is a malfunction notification on the wired side. Then, the server gives a warning and sends prompt information to confirm that a fault occurs in the base station in time.

3. When the server side fails to receive information about a base station in the data reported by all base stations surrounding the base station, the server sends a restart instruction to the base station and monitors information about the base station in the data reported by all base stations surrounding the base station. If the server sends the restart instruction for more than preset times within a unit time and still fails to receive related reported data, the base station is considered to be deactivated, and there is a fault of irregularity in positioning information broadcasting on the wireless side. Then, the server gives a warning and sends prompt information to timely confirm that a fault occurs in the base station.

In other embodiments, the server calculates actual map coordinates of a base station based on broadcast positioning information of surrounding base stations received by the base station, and compares the actual map coordinates with the map coordinates of the base station stored in the server so as to confirm the installation location of the base station is correct/incorrect. The following specific steps are included:

By means of broadcast positioning information of surrounding base stations received by the base station in the data reported by the base station, the server calculates actual map coordinates of the base station, and compares the actual map coordinates with the map coordinates of the base station stored in the server. Then, if the comparison value exceeds a default value, the server confirms that the installation location of the base station is incorrect, and then gives a warning and sends fault prompt information.

The server is further configured to send configuration information and network parameters to all the base stations in the private network. Wherein the configuration information includes broadcasting content, broadcasting period and broadcasting power, and the network parameters include an IP address, an gateway address, a subnet mask, a server address, a server port number or more. It is convenient for the server to perform centralized management and maintenance on all the base stations.

The server is further configured to send a firmware update instruction to a base station, and receives update confirmation information returned by the base station so as to activate firmware online upgrading. When ready, the base station sends confirmation information to the server, and the server sends firmware packets on the frame-by-frame basis according to the frame number thereof and waits for the corresponding confirmation information feedback by the base station. If the server fails to receive the confirmation information fed back by the base station within a preset time, the server sends reset information to the corresponding base station so as to prompt that the firmware updating has failed.

In other embodiments, by receiving broadcast data, including a base station ID and a signal intensity value, broadcasted by at least three base stations, the mobile terminal can also calculate current location information thereof. Hence, the positioning of a mobile terminal is realized by the positioning system of the present invention.

With reference to FIG. 1, to describe the specific working principle of the network system for positioning services of the present invention, an embodiment of the present invention provides a scenario where the network system is applied in a shopping mall for positioning a mobile terminal, wherein the base stations are positioning base stations. The specific description will be given below.

The network system of the invention at hand is constructed in a shopping mall. There are multiple base stations and multiple of dedicated access apparatuses. The multiple of base stations, as well as the base stations and the dedicated access apparatuses, are connected with each other through cables, and the dedicated access apparatuses are accessed to a server through Ethernet. When the base stations collect radio signals, including a mobile terminal ID and a signal intensity value, sent by a mobile terminal, the signals are sent to the server through the cables and the dedicated access apparatuses.

Specifically, at least one base station sends the collected signal intensity value of the mobile terminal and the collected ID of the mobile terminal to the server. The server can record the collected data into a shared database and then confirm, based on the information, the location of the mobile terminal that currently requests to acquire location information.

When the server receives a positioning request that is sent by a mobile terminal and forwarded by at least one base station, the server, based on the received mobile terminal ID and signal intensity value, calculates the current location information of the mobile terminal so as to confirm the location of the mobile terminal. Wherein, the mobile terminal is a hardware apparatus that has an interaction function or can run a particular function related to the location.

In a specific embodiment, before the base stations are interacted with the server to confirm the location information of the mobile terminal, a TCP link is established to prepare for the subsequent information transmission. Thus, it is required to execute the following previous steps:

1. A link establishment request from a base station is monitored.

After activation, the server activates monitoring at a configuration port, waits for a link establishment request from a base station, and immediately establishes a link once a link establishment request has been monitored.

2. After the link is established successfully, a heartbeat packet sent by the base station is received, and a success confirmation packet is returned.

After powered on, the base station sends a request for establishing a TCP link to the server, and the server receives the request from the base station and establishes communication connection with the base station through three times handshake. After the link is established successfully, the base station uploads its operating state to the server, specifically, by sending a standard heartbeat packet. The server returns a success confirmation packet upon receiving the heartbeat packet, so as to return an internal address corresponding to the base station and a current system time to the base station through the success message confirmation packet, wherein the success message confirmation packet includes the internal address corresponding to the base station and the current system time. Upon receiving the returned internal address and the server system time, the base station updates a base station system time and enters a normal operating state if the internal address is an internal address corresponding to the base station.

After a link is established successfully between the server and a base station and the base station enters the normal operating state, the base station collects internal addresses and signal intensity values of wireless apparatuses within a radiation range thereof, wherein the wireless apparatuses include base stations and mobile terminals, and the mobile terminals are hardware apparatuses that have an interaction function or can run a particular location-related function. The base station periodically, for example, 10 times per second, uploads the collected related information to the server for processing. Wherein, the base station uploads information about a wireless apparatus to the server in a uniform information packet format.

If the base station fails to collect any information about a wireless apparatus during interaction with the server, it is not required to upload the information about the wireless apparatus to the server. If the base station fails to collect any information about a wireless apparatus during a preset time, for example, within 10 seconds, the base station actively sends a standard heartbeat packet to the server to inform the server that it is still in the normal operating state. Upon receiving the information packet sent by the base station, the server will confirm the correctness of data in the information packet, record the data as original data into a shared database and feed back a success message confirmation packet if the data is correct, and respond by a failure message confirmation packet if the data is incorrect.

In other embodiments, if the server receives a standard heartbeat packet, the server directly returns a success message confirmation packet. Wherein, the success message confirmation packet includes the internal address corresponding to the base station and the current system time. Particularly, even if the base station fails to receive a message confirmation packet from the server, the base station still periodically send the information packet of the corresponding wireless apparatus to the server.

If the server fails to receive any message (including the information packet and the heartbeat packet) sent by the base station within a preset time, the server confirms that the link established with the base station goes wrong, resets the corresponding base station, releases the corresponding link established with the base station, and resumes a monitoring state. Similarly, if, after the base station sends a preset number of message packets, the number of received success confirmation packets is less than a preset number, the base station confirms that the link established with the server goes wrong, directly releases the TCP link and requests the server to reestablish a link.

Based on the interaction process between the server and the base station, when the mobile terminal requests the base station to acquire its location information, the base station forwards the request information to the server through the established TCP link, and the server performs subsequent processing based on the request.

On one hand, based on the working principle of the network system of the present invention, the server calculates location information of a mobile terminal by receiving radiation signals of the same mobile terminal collected by at least one base station, and feeds back the location information to the mobile terminal through other data networks, so that a user can receive the location information in real time and a high-efficiency indoor positioning service is provided to the user. On the other hand, the mobile terminal can receive broadcast data, including a base station ID and a signal intensity value, broadcasted by at least three base stations, and calculate the location information thereof based on the broadcast data.

The foregoing descriptions are merely some implementations of the present invention. It should be noted that, to one person of ordinary skill in the art, various improvements and modifications may be made without departing from the principle of the present invention, and these improvements and modifications shall be deemed as falling into the protection scope of the present invention.

What is claimed is:

1. A network system for positioning services based on wireless communication technologies, comprising base stations, a dedicated access apparatus, cables, a server and Ethernet; the base stations, the dedicated access apparatus and the cables constituting a private network; the server and the Ethernet constituting a public network, wherein:
    the base stations are configured to send and receive radio signals in a broadcasting manner, and transmit the received radio signals to the server through the cables and the dedicated access apparatus;
    the dedicated access apparatus is configured to transfer transmission data between the private network and the public network, forward data from the base stations to the server, and forward data from the server to a corresponding base station;
    the cables are configured to perform data transmission between the base stations and between the base stations and the dedicated access apparatus; and
    the server is configured to perform corresponding data processing according to the received data collected by at least one base station;
    the server is further configured to receive and save related data of each of the base stations so as to monitor all the base stations in real time;
    when the server fails to receive data reported by a base station, the server is configured to send a restart instruction to the base station and monitors the data reported by the base station or surrounding base stations so as to confirm whether an error has occurred in the base station;
    the server is configured to calculate actual map coordinates of a base station based on broadcast positioning information of surrounding base stations received by the base station, and compare the actual map coordinates with the map coordinates of the base station stored in the server so as to confirm that the installation location of the base station is correct.

2. The system according to claim 1, wherein the base stations are configured to receive radio signals from other base stations, and transmit the radio signals to the server through the cables and the dedicated access apparatus so as to monitor the other base stations.

3. The system according to claim 1, wherein the base stations are further configured to forward, to the dedicated access apparatus, data from other base stations that are connected through cables.

4. The system according to claim 1, wherein the base stations are further configured to supply electricity to other base stations through the cables.

5. The system according to claim 1, wherein the dedicated access apparatus is further configured to provide, through the cables, electricity to base stations that are connected to the dedicated access apparatus.

6. The system according to claim 1, wherein the related data of the base stations comprising an apparatus ID, map coordinates, a network address, and a wired connection topological relation between the base stations.

7. The system according to claim 1, wherein the fault of the base station comprising malfunction notification on a wired side, data forwarding malfunction on the wired side, and irregularity in positioning information broadcasting on a wireless side.

8. The system according to claim 1, wherein the server is further configured to send configuration information and network parameters to all the base stations so that each of the base stations executes a configuration operation according to the received configuration information and network parameters.

9. The system according to claim 8, wherein the configuration information comprising broadcasting content, broadcasting period and broadcasting power.

10. The system according to claim 1, wherein the server is further configured to send a firmware update instruction to a base station, and receives update confirmation information returned by the base station so as to activate firmware online upgrading.

11. The system according to claim 1, further comprising a mobile terminal; and the server is further configured to perform corresponding data processing according to the received data, related to the mobile terminal, collected by at least one base station.

12. The system according to claim 11, wherein the server is further configured to calculate location information of the mobile terminal according to a received mobile terminal ID and a signal intensity value collected by at least one base station.

13. The system according to claim 12, wherein the mobile terminal is a hardware apparatus that has an interaction function or is configured to run a particular function related to location.

14. The system according to claim 11, wherein the mobile terminal is a hardware apparatus that has an interaction function or is configured to run a particular function related to location.

15. The system according to claim 14, wherein the mobile terminal is configured to receive broadcast data, including a base station ID and a signal intensity value, broadcasted by at least three base stations, and calculate location information of the base stations based on the broadcast data.

16. The system according to claim 11, wherein the system is configured to position the mobile terminal.

\* \* \* \* \*